US006099956A

United States Patent [19]

Jones

[11] Patent Number: 6,099,956
[45] Date of Patent: Aug. 8, 2000

[54] RECORDING MEDIUM

[75] Inventor: Richard Roy Jones, Hendersonville, N.C.

[73] Assignee: Agfa Corporation, Wilmington, Del.

[21] Appl. No.: 09/118,733

[22] Filed: Jul. 17, 1998

[51] Int. Cl.[7] .............................. B32B 5/16; B32B 27/36; B32B 27/08

[52] U.S. Cl. .......................... 428/323; 428/331; 428/341; 428/480; 428/520

[58] Field of Search .................................... 428/323, 340, 428/341, 423.1, 474.4, 500, 195, 328, 331, 411.1, 475.2, 476.3, 477.7, 480, 483, 515

[56] References Cited

U.S. PATENT DOCUMENTS

| | | | |
|---|---|---|---|
| 3,889,270 | 6/1975 | Hoffmann et al. | 346/1 |
| 4,460,637 | 7/1984 | Miyamoto et al. | 428/212 |
| 4,542,059 | 9/1985 | Toganoh et al. | 428/141 |
| 4,592,951 | 6/1986 | Viola | 428/323 |
| 4,636,410 | 1/1987 | Akiya et al. | 427/261 |
| 4,770,934 | 9/1988 | Yamasaki et al. | 428/331 |
| 5,202,205 | 4/1993 | Malhota | 430/17 |
| 5,276,468 | 1/1994 | Deur et al. | 346/140 R |
| 5,302,436 | 4/1994 | Miller | 428/195 |
| 5,418,078 | 5/1995 | Desie et al. | 428/704 |
| 5,529,972 | 6/1996 | Ramello et al. | 503/227 |
| 5,695,588 | 12/1997 | Daems et al. | 156/247 |
| 5,753,360 | 5/1998 | Jones et al. | 428/323 |
| 5,756,226 | 5/1998 | Valentini et al. | 428/704 |
| 5,858,514 | 1/1999 | Bowers | 428/195 |

FOREIGN PATENT DOCUMENTS

| | | |
|---|---|---|
| 435675 | 7/1991 | European Pat. Off. . |
| 487349 | 5/1992 | European Pat. Off. . |
| 582466 | 2/1994 | European Pat. Off. . |
| 0634287 | 1/1995 | European Pat. Off. . |
| 62-160287 | 7/1987 | Japan . |
| 4364947 | 12/1992 | Japan . |
| 551470 | 3/1993 | Japan . |
| 632046 | 2/1994 | Japan . |
| 693122 | 4/1994 | Japan . |
| 781214 | 3/1995 | Japan . |
| 2147003 | 5/1985 | United Kingdom . |

*Primary Examiner*—Paul Thibodeau
*Assistant Examiner*—Sheeba Ahmed
*Attorney, Agent, or Firm*—Joseph T. Guy, Jr.

[57] ABSTRACT

Described is a recording medium which is specifically advantageous for use with phase change ink recording. The media comprises a support with a receptive layer coated thereon. The receptive layer comprises 2.5–48.5%, by weight, a water soluble polymer; 0.15–25%, by weight, gelatin; and 50–95%, by weight, a water insoluble polymer. The media offers improved resistance to scratching while still maintaining adhesion properties.

37 Claims, No Drawings

RECORDING MEDIUM

FIELD OF INVENTION

The present invention is directed to an improved media for use with various printing modalities. More specifically, the present invention is directed to an improved media which is superior as a receptive for phase change ink printing and which has increased resistance to scratching of the surface.

BACKGROUND OF THE INVENTION

Transparent films displaying information are widely used throughout many different industries and for many applications. Typically, a positive image is formed by placing an ink or pigment onto a transparent plastic sheet. The image is then displayed by projection of transmitted light.

Media which is suitable for phase change ink printing has been described in commonly assigned U.S. Pat. Nos. 5,756,226 and 5,753,360. The media taught therein is superior with regards to adhesion relative to available teachings in the art. Improvements with regard to the ability of the media to resist scratching is still desired.

SUMMARY OF THE INVENTION

It is an object of the present invention to provide a media which resist scratching.

It is another object of the present invention to provide a media which provides adequate adhesion for phase change ink printed thereon.

These and other advantages, as will be apparent to one skilled in the art are provided in a recording medium for phase change ink recording comprising: a support; a receptive layer coated on the support wherein the receptive layer comprises: 2.5–48.5%, by weight, a water soluble polymer; 0.15–25%, by weight, gelatin; and 50–95%, by weight, a water insoluble polymer.

A preferred embodiment is provided in A recording medium for phase change ink recording comprising: a support; a receptive layer coated on the support wherein the receptive layer comprises: 5–50%, by weight, a water soluble component; and 50–95%, by weight, a water insoluble polymer; wherein said water soluble component comprises; 3–50% gelatin; and 50–97% water soluble polymer.

DETAILED DESCRIPTION OF THE INVENTION

The inventive media comprises a support with a receptive layer coated thereon.

The receptive layer comprises a binder with an optional inorganic particulate material dispersed therein. The binder comprises a water insoluble polymer and a water soluble component comprising gelatin and a water soluble polymer.

The term "water soluble" refers specifically to a compound, or mixture of compounds, which dissolves in water completely as characterized by the hydrodynamic particle diameter in water as measured by light scattering. For purposes of the present invention, a compound, or mixture of compounds, with a light scattering hydrodynamic particle diameter, in water, of no more than 0.05 $\mu$m indicates molecular scale dissolution. A compound, or mixture of compounds, with a light scattering hydrodynamic particle diameter, in water, of no more than 0.05 $\mu$m is referred to herein as a water soluble.

The water soluble polymer preferably comprises at least one compound chosen from a group consisting of polyvinyl alcohol, polyacrylamide, methyl cellulose, and polyvinyl pyrrolidone. The water soluble polymer more preferably comprises at least one element chosen from a group consisting of polyvinyl alcohol, polyacrylamide and polyvinyl pyrrolidone. The most preferred water soluble polymer is polyvinylalcohol with a degree of hydrolysis between 70 and 100%.

The term "water insoluble polymer" refers specifically to polymers which are described as consisting of a dispersion or emulsion of polymer in water and are characterized by the hydrodynamic particle diameter, in water, as determined by light scattering. A light scattering hydrodynamic particle diameter, in water, of greater than 0.05 $\mu$m implies a dispersion of discrete particles containing one or more large molecule requiring stabilization by surfactants or other means to remain suspended. The water insoluble polymer preferably comprises at least one polymerizable monomer chosen from acrylic ester, olefin, aromatic substituted olefin, vinyl, aromatic substituted vinyl, urethane and unsaturated amide. The water insoluble polymers may comprise polar functionality with the proviso that the degree of functionality is below a level sufficient to form a water soluble polymer as characterized by having a hydrodynamic particle size of less than 0.05 $\mu$m. A particularly preferred water insoluble polymer is styrene. More preferred is a polymer comprising 10–100%, by weight, styrene and 0–90%, by weight, acrylic ester. More preferred is a copolymer comprising 50–99%, by weight, styrene and 1–50%, by weight, acrylic ester. Most preferred is a copolymer comprising a styrene core and a shell comprising an acrylic acid, examples of which are described in U.S. Pat. Nos. 5,194,263; 5,214,096 and 5,460,263.

The ratio of water soluble component to water insoluble polymer is chosen to maximize the adhesion, as determined by impact resistance, and to reduce the tendancy for the media to scratch, while at the same time taking advantage of the ability of the phase change ink to adequately adhere to the media. It is preferred that the combined weight of water soluble component and water insoluble polymer comprise at least 50%, by weight, water insoluble polymer. Below 50% water insoluble polymer adhesion unexpectedly deteriorates. It is more preferable that the combined weight of the water soluble component and water insoluble polymer comprise at least 70%, by weight, water insoluble polymer and most preferably at least 75% by weight water insoluble polymer. Most preferred is at least 80%, by weight, water insoluble polymer. It is preferred that the combined weight of the water soluble polymer and water insoluble polymer comprise no more than 95%, by weight, water insoluble polymer due to a decrease in adhesion between the media and the phase change ink.

A preferred media comprises a receptive layer comprising polyvinyl alcohol as the water soluble polymer and a polymer comprising styrene as the water insoluble polymer. More preferably, the water insoluble polymer is a polymer comprising 10–100% styrene and 0–90% acrylic ester. In the preferred media the polymer comprising styrene represents 50% to 95%, by weight, of the total weight of the polyvinyl alcohol and polymer comprising styrene. In a particularly preferred media, the polymer comprising styrene represents 80% to 90%, by weight, of the total weight of the polyvinyl alcohol and polymer comprising styrene.

A particularly preferred media comprises a receptive layer comprising polyvinylalcohol as the water soluble polymer and a copolymer comprising a styrene core with a shell comprising acrylic ester as the water insoluble polymer.

Inorganic particulate material may be added to the receptive layer to increase adhesion. The optional inorganic particulate material is preferably chosen from a group consisting of colloidal silica and alumina. The preferred inorganic particulate material is silica with a hydrodynamic diameter in water of no more than 0.3 μm. More preferably the inorganic particulate material has a hydrodynamic diameter in water of no more than 0.1 μm. Also preferred as a particulate material is silica with a hydrodynamic diameter in water of no more than about 0.05 μm. The silica is preferably at least 0.005 μm. A hydrodynamic diameter in water between 0.005 μm and 0.030 μm with a specific surface area between 100 and 300 $m^2/g$ is particularly advantageous for superior adhesion. More preferred for adhesion is a silica hydrodynamic diameter in water of 0.010 to 0.020 μm with a surface area of 200 to 300 $m^2/g$. Scratch resistance is most improved with a silica hydrodynamic diameter in water of 0.01 to 0.015 μm and a specific surface area of 200 to 250 $m^2/g$.

A preferred colloidal silica for use in this invention is a multispherically coupled and/or branched colloidal silica. Specific examples are colloidal silica particles having a long chain structure in which spherical colloidal silica is coupled in a multispherical form. Also preferred is a colloidal silica in which the coupled silica is branched. Multispherically coupled colloidal silica is obtained by forming particle-particle bonds between primary particles of spherical silica by interspersing metal ions having a valence of two or more between the spherical silica particles. Preferably, the multispherically coupled colloidal silica has at least three particles coupled together. More preferably the multispherically coupled colloidal silica has at least five particles coupled together and most preferably the multispherically coupled colloidal silica has at least seven particles coupled together. The hydrodynamic diameter in water of the inorganic particulate material is determined as the diameter of a spherical particle with the same hydrodynamic properties as the sample in question. By way of example, a fibrous silica particle with dimensions of approximately 0.150 μm by 0.014 μm exhibits a hydrodynamic diameter in water of approximately 0.035 μm.

The inorganic particulate matter of the receptive layer represents less than 50%, by weight, of the combined coating weight of the inorganic particulate matter, the water soluble component and the water insoluble polymer. In a preferred embodiment the inorganic particulate matter of the receptive layer represents less than 20%, by weight, of the combined coating weight of the inorganic particulate matter, the water soluble component and the water insoluble polymer. In a more preferred embodiment the inorganic particulate matter of the receptive layer represents no more than 5%, by weight, of the combined coating weight of the inorganic particulate matter, the water soluble component and the water insoluble polymer.

It is most preferable to add a cross linker to the receptive layer to increase the strength of the dried coating. Aldehyde hardeners such as formaldehyde or glutaraldehyde are suitable hardeners for polyvinyl alcohol. Pyridinium based hardeners such as those described in, for example, U.S. Pat. Nos. 3,880,665, 4,418,142, 4,063,952 and 4,014,862 and imidazolium hardeners as defined in Fodor, et al, U.S. Pat. Nos. 5,459,029; 5,378,842; 5,591,863 and 5,601,971 are suitable for use in the present invention. Aziridenes and epoxides are also suitable hardeners.

Crosslinking is well known in the art to form intermolecular bonds between various molecules thereby forming a network. In the instant invention a crosslinker may be chosen to form intermolecular bonds between pairs of water soluble polymers, between pairs of water insoluble polymers, between gelatin strands, or the crosslinker may form bonds between water soluble polymers and/or water insoluble polymers and/or gelatin. If crosslinking is applied it is most preferable to crosslink the polymers to the inorganic particulate matter. It is preferable to apply any crosslinking additive just prior to or during coating. It is contemplated that the crosslinking may occur prior to formation of the coating solution or in situ.

The term "gelatin" as used herein refers to the protein substances which are derived from collagen. In the context of the present invention "gelatin" also refers to substantially equivalent substances such as synthetic analogues of gelatin. Generally, gelatin is classified as alkaline gelatin, acidic gelatin or enzymatic gelatin. Alkaline gelatin is obtained from the treatment of collagen with a base such as calcium hydroxide, for example. Acidic gelatin is that which is obtained from the treatment of collagen in acid such as, for example, hydrochloric acid and enzymatic gelatin is generated with a hydrolase treatment of collagen. The teachings of the present invention are not restricted to gelatin type or the molecular weight of the gelatin.

Bloom is a property of gelatin which measures the rigidity of gelatins and is the force, in grams, required to produce a specific distortion of the gel surface by a plunger. The bloom is measured according to British Standard Specification 757:1975. In the present invention bloom is preferably at least 100 grams. More preferred is a gelatin with a bloom of at least 200 grams and most preferred is a gelatin with a bloom of at least 300 grams.

Other materials can be added to the receptive layer to aid in coating and to alter the rheological properties of either the coating solution or the dried layer. Polymethylmethacrylate beads can be added to assist with transport through phase change ink printers. Care must be taken to insure that the amount of beads is maintained at a low enough level to insure that adhesion of the phase change ink to the substrate is not deteriorated. Preferably, the beads should represent no more than about 1.0% by weight of the receptive layer. It is conventional to add surfactants to a coating solution to improve the coating quality. Surfactants and conventional coating aids are compatible with the present invention.

The coating weight of the receptive layer binder is preferably at least 1 $mg/dm^2$ and no more than 200 $mg/dm^2$. Above 200 $mg/dm^2$ the adhesion advantage diminishes and the increased cost of raw materials is not justified. It is more preferred that the coating weight of the receptive layer binder be at least 10 $mg/dm^2$. With high levels of gelatin in the water soluble component it is most preferable that the coating weight of the receptive layer binder be at least 25 $mg/dm^2$ to no more than 80 $mg/dm^2$. A coating weight of the receptive layer binder of no more than 100 $mg/dm^2$ is preferred and more preferred is a coating weight of the receptive layer binder of at least 15 $mg/dm^2$ and no more than 45 $mg/dm^2$.

The preferred support is a polyester obtained from the condensation polymerization of a diol and a dicarboxylic acid. Preferred dicarboxylic acids include terephthalate acid, isophthalic acid, phthalic acid, naphthalenedicarboxylic acid, adipic acid and sebacic acid. Preferred diols include ethylene glycol, trimethylene glycol, tetramethylene glycol and cyclohexanedimethanol. Specific polyesters suitable for use in the present invention are polyethylene terephthalate, polyethylene-p-hydroxybenzoate, poly-1,4-cyclohexylene dimethylene terephthalate, and polyethylene-2,6-naphthalenecarboxylate. Polyethylene terephthalate is the most preferred polyester for the support due to superior water resistance, excellent chemical resistance and durability. The polyester support is preferably 1–10 mil in thickness. More preferably the polyester support is 3–8 mil thick and most preferably the polyester support is either 3.5–4.5 mil or 6–8 mil thick. The receptive layer may also be applied to cellulose base media such as paper and the like.

A primer layer is preferably included between the receptive layer and the support to provide increased adhesion between the receptive layer and the support. Preferred primer layers are resin layers or antistatic layers. Resin and antistatic primer layers are described, for example, in U.S. Pat. Nos. 3,567,452; 4,916,011; 4,701,403; 4,891,308; and 4,225,665, and 5,554,447.

The primer layer is typically applied and dry-cured during the manufacture of the polyester support. When polyethylene terephthalate is manufactured for use as a photographic support, the polymer is cast as a film, the mixed polymer primer layer composition is applied to one or both sides and the structure is then biaxially stretched. The biaxial stretching is optionally followed by coating of either a gelatin subbing layer or an antistatic layer. Upon completion of the stretching and the application of the primer layer compositions, it is necessary to remove strain and tension in the support by a heat treatment comparable to the annealing of glass. Air temperatures of from 100° C. to 160° C. are typically used for this heat treatment.

It is preferable to activate the surface of the support prior to coating to improve the coating quality thereon. The activation can be accomplished by corona-discharge, glow-discharge, UV-rays or flame treatment. Corona-discharge is preferred and can be carried out to apply an energy of 1 mw to 1 $kW/m^2$. More preferred is an energy of 0.1 w to 5 $w/m^2$.

Bactericides may optionally be added to the receptive layer or the primer layer to prevent bacteria growth. Preferred are Kathon®, neomycin sulfate, and others as known in the art.

An optional, but preferred backing layer can be added opposite the receptive layer to decrease curl, impart color, assist in transport, and other properties as common to the art. The backing layer may comprise cross linkers to assist in the formation of a stronger matrix. Preferred cross linkers for the backing layer are carboxyl activating agents as defined in Weatherill, U.S. Pat. No. 5,391,477. Most preferred are imidazolium hardeners as defined in Fodor, et al, U.S. Pat. Nos. 5,459,029; 5,378,842; 5,591,863; and 5,601,971. Aziridine and epoxy crosslinkers are also suitable crosslinkers. The backing layer may also comprise transport beads such as polymethylmethacrylate. It is known in the art to add various surfactants to improve coating quality. Such teachings are relevant to the backing layer of the present invention.

Phase change inks are characterized, in part, by their propensity to remain in a solid phase at ambient temperature and in the liquid phase at elevated temperatures in the printing head. The ink is heated to the liquid phase and droplets of liquid ink are ejected from the printing head. When the ink droplets contact the surface of the printing media they quickly solidify to form a pattern of solid ink drops. This process is known as direct ink jet printing. Other devices deliver the liquid ink droplets to a heated drum, maintained just below the melting temperature of the phase change inks. The patterned ink is then transferred from the drum in the rubbery state to the media under pressure. This process is known as indirect printing.

The phase change ink composition comprises the combination of a phase change ink carrier and a compatible colorant. The thermomechanical properties of the carrier are adjusted according to the mode of printing and further to match the precise parameters of the printer design. Thus each printer design has a matching optimized ink.

Exemplary phase change ink colorants comprise a phase change ink soluble complex of (a) a tertiary alkyl primary amine and (b) dye chromophores having at least one pendant acid functional group in the free acid form. Each of the dye chromophores employed in producing the phase change ink colorants are characterized as follows: (1) the unmodified counterpart dye chromophores employed in the formation of the chemical modified dye chromophores have limited solubility in the phase change ink carrier compositions, (2) the chemically modified dye chromophores have at least one free acid group, and (3) the chemically modified dye chromophores form phase change ink soluble complexes with tertiary alkyl primary amines. For example, the modified phase change ink colorants can be produced from unmodified dye chromophores such as the class of Color Index dyes referred to as Acid and Direct dyes. These unmodified dye chromophores have limited solubility in the phase change ink carrier so that insufficient color is produced from inks made from these carriers. The modified dye chromophore preferably comprises a free acid derivative of an xanthene dye.

The tertiary alkyl primary amine typically includes alkyl groups having a total of 12 to 22 carbon atoms, and preferably from 12 to 14 carbon atoms. The tertiary alkyl primary amines of particular interest are produced by Rohm and Haas, Incorporated of Houston, Tex. under the trade names Primene JMT and Primene 81-R. Primene 81-R is the preferred material. The tertiary alkyl primary amine of this invention comprises a composition represented by the structural formula:

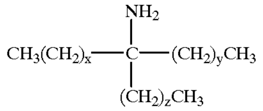

wherein:

x is an integer of from 0 to 18;

y is an integer of from 0 to 18; and z is an integer of from 0 to 18; with the proviso that the integers x, y and z are chosen according to the relationship:

$$x+y+z=8 \text{ to } 18.$$

Exemplary phase change ink carriers typically comprise a fatty amide containing material. The fatty amide-containing material of the phase change ink carrier composition preferably comprises a tetraamide compound. The preferred tetra-amide compounds for producing the phase change ink carrier composition are dimeric acid-based tetra-amides which preferably include the reaction product of a fatty acid, a diamine such as ethylene diamine and a dimer acid. Fatty acids having from 10 to 22 carbon atoms are preferably employed in the formation of the diner acid-based tetra-amide. These diner acid-based tetramides are produced by Union Camp and comprise the reaction product of ethylene diamine, dimer acid, and a fatty acid chosen from decanoic acid, myristic acid, stearic acid and docasanic acid. The preferred dimer acid-based tetraamide is the reaction product of diner acid, ethylene diamine and stearic acid in a stoichiometric ratio of 1:2:2, respectively. Stearic acid is the preferred fatty acid reactant because its adduct with dimer acid and ethylene diamine has the lowest viscosity of the dimer acid-based tetra-amides.

The fatty amide-containing material can also comprise a mono-amide. In fact, in the preferred case, the phase change ink carrier composition comprises both a tetra-amide compound and a mono-amide compound. The mono-amide compound typically comprises either a primary or secondary mono-amide, but is preferably a secondary mono-amide. Of the primary mono-amides stearamide, such as Kemamide S, manufactured by Witco Chemical Company, can be employed. As for the secondary mono-amides behenyl behemamide and stearyl stearamide are extremely useful mono-amides.

Another way of describing the secondary mono-amide compound is by structural formula. More specifically a suitable secondary mono-amide compound is represented by the structural formula:

$$C_xH_y\text{-CO-NHC}_aH_b$$

wherein:

x is an integer from 5 to 21;

y is an integer from 11 to 43;

a is an integer from 6 to 22; and b is an integer from 13 to 45.

The preferred fatty amide-containing materials comprise a plurality of fatty amide materials which are physically compatible with each other. Typically, even when a plurality of fatty amide-containing compounds are employed to produce the phase change ink carrier composition, the carrier composition has a substantially single melting point transition. The melting point of the phase change ink carrier composition is preferably at least about 70° C., more preferably at least 80° C. and most preferably at least 85° C.

The preferred phase change ink carrier composition comprises a tetra-amide and a mono-amide. The weight ratio of the tetra-amide to the mono-amide in the preferred instance is from about 2:1 to 1:10 and more preferably from about 1:1 to 1:3.

Modifiers can be added to the carrier composition to increase the flexibility and adhesion. A preferred modifier is a tackifier. Suitable tackifiers are compatible with fatty amide-containing materials and include, for example, Foral 85, a glycerol ester of hydrogenated abietic acid, and Foral 105, a pentaerythritol ester of hydroabietic acid, both manufactured by Hercules Chemical Company; Nevtac 100 and Nevtac 80. synthetic polyterpene resins manufactured by Neville Chemical Company, Wingtack 86, a modified synthetic polyterpene resin manufactured by Goodyear Chemical Company, and Arakawa KE 311, a rosin ester manufactured by Arakawa Chemical Company.

Plasticizers are optionally, and preferably, added to the phase change ink carrier to increase flexibility and lower melt viscosity. Particularly suitable plasticizers include dioctyl phthalate, diundecyl phthalate, alkylbenzyl phthalate (Santicizer 278) and triphenyl phosphate, all manufactured by Monsanto Chemical Company; tributoxyethyl phosphate (KP-140) manufactured by FMC Corporation; dicyclohexyl phthalate (Morflex 150) manufactured by Morflex Chemical Company Inc.; and trioctyl trimellitate, manufactured by Kodak.

Other materials may be added to the phase change ink carrier composition. In a typical phase change ink chemical composition, antioxidants are added for preventing discoloration of the carrier composition. The preferred antioxidant materials include Irganox 1010 manufactured by Ciba Geigy; and Naugard 76, Naugard 512, and Naugard 524 manufactured by Uniroyal Chemical Company; the most preferred antioxidant being Naugard 524.

A particularly suitable phase change ink carrier composition comprises a tetra-amide and a mono-amide compound, a tackifier, a plasticizer, and a viscosity modifying agent. The preferred compositional ranges of this phase change ink carrier composition are as follows: from about 10 to 50 weight percent of a tetraamide compound, from about 30 to 80 weight percent of a mono-amide compound, from about 0 to 25 weight percent of a tackifier, from about 0 to 25 weight percent of a plasticizer, and from about 0 to 10 weight percent of a viscosity modifying agent.

Preferred phase change inks exhibit a high level of lightness, chroma, and rectilinear light transmissivity when utilized in a thin film of substantially uniform thickness, so that color images can be conveyed using overhead projection techniques. Another preferred property of the ink carrier is the ability to be reoriented into a thin film after printing without cracking or transferring to the rollers typically used for reorientation.

A phase change ink printed substrate is typically produced in a drop-on-demand ink jet printer. The phase change ink is applied to at least one surface of the substrate in the form of a predetermined pattern of solidified drops. Upon impacting the substrate surface, the ink drops, which are essentially spherical in flight, wet the substrate, undergo a liquid-to-solid phase change, and adhere to the substrate. Each drop on the substrate surface is non-uniform in thickness and transmits light in a non-rectilinear path.

The pattern of solidified phase change ink drops can, however, be reoriented to produce a light-transmissive phase change ink film on the substrate which has a high degree of lightness and chroma, when measured with a transmission spectrophotometer, and which transmits light in a substantially rectilinear path. The reorientation step involves the controlled formation of a phase change ink layer of a substantially uniform thickness. After reorientation, the layer of light-transmissive ink will transmit light in a substantially rectilinear path. If the substrate on which the ink is applied is also light transmissive, a projected image having clearly visible intense colors can be formed when a beam of light is projected through the reoriented printed substrate.

The receptive layer is applied to the support as a coating suspension in a solvent. The most preferred solvent is water. The coating suspension comprises inorganic particulate material, a water soluble polymer, a gelatin and a water insoluble polymer. After application of the coating suspension onto the support the solvent is removed yielding a solid receptive layer comprising inorganic particulate matter, water soluble polymer, gelatin and water insoluble polymer.

Once solutions are coated on the support, the aggregation process becomes prevalent as the coating dries. The liquid solution evolves into an irregular surface with a wide range of shapes and tortuous patterns depending upon both the drying rate and the initial concentration of the coating solutions. At very low drying rates a porous film appears to be uniform but with numerous cracks. At proper drying rates the film evolves into a sequence of rounded small islands separated by pores. As the drying rate increases further, the islands become larger. Measurements of the island size can be measured by using scaled electronmicrographs.

The coating weight is measured gravimetrically. The sample is cut into a 10 cm×10 cm square and weighed on a calibrated analytical balance to the nearest 0.1 mgm. The cut sample is then immersed into acetone, or another suitable solvent, to soften and lift the coating as a free membrane. Any strongly adhered coating is removed with an acetone soaked wipe. The sample is then dried and reweighed to calculate the coating weight in mgm/sqdm by difference.

Impact represents a measure of the adhesion of the phase change ink under conditions of rapid delamination with higher numbers being preferred. Impact is measured by a Gardner Impact Tester (Cat No. 1G1121) from BYK Gardner, Silver Spring, Md. The tester is modified by placing a rubber stopper in the drilled out anvil to a position slightly above being flush with the top of the anvil. This is done so as to avoid gross distortions of the PET base film upon impact by the hammer. The weight used to deliver the hammer blow is the 125 gm weight available from BYK Gardner. A specially modified Tektronix Phaser 340 is used to deliver in one media pass a double layer of black ink uniformly to a 10 cm×19 cm area and after waiting for at least five minutes for the wax layer to come to room temperature, impacts are delivered from a height of 10 cm to each of four spots on a line parallel to the leading edge of the printed sheet on the side opposite the wax. One impact is delivered in the first spot, two in the second in succession, and so on up to a maximum of six impacts in the sixth spot. After impacting, Scotch Magic(TM) Tape (type 810) form 3M Company, St. Paul, Minn. is applied over the impacted spots and slowly removed to lift any dislodged ink. The sample is then rated on a scale of 0 to 6 depending on the number of impacts required to dislodge ink from the impacted area. The following definition of grades were used:

| Grade | Appearance |
|---|---|
| 0 | Significant ink dislodged in one hammer blow with complete removal with two or more blows |
| 1 | No or very little ink removed in one blow, significant ink dislodged in two blows, and complete removal with three or more blows |
| 2 | No or very little ink removed in one or two blows, significant ink dislodged in three blows, and complete removal with four blows |
| 3 | No or very little in removed with one, two or three blows, significant ink dislodged with four blows |
| 4 | No or very little ink removed using up to four consecutive blows |
| 5 | No or very little ink removed using up to five consecutive blows |
| 6 | No or very little ink removed using up to six consecutive blows |

The judgment of how much ink removal is considered “very little” is made by a comparison to a region which has not been impacted but has had the tape applied and removed.

To remove aging factors from consideration, the tape test densities reported herein are for fresh printings on four week old coatings.

The scratch resistance of coated media is measured by the use of the ANSI PH1.37-1977(R1989) method for determination of the dry scratch resistance of photographic film. The device used is described in the ANSI IT9.14-1992 method for wet scratch resistance. Brass weights up to 900 g. in the continuous loading mode are used to bear on a spherical sapphire stylus of 0.38 mm radius of curvature, allowing an estimated maximum loading of 300 kgm/cm$^2$. Since the stylus is a constant, the results can be reported in gram mass required to break through the coating to the surface of the base polymer. Scratch data is typically accurate to within approximately 50 gms. The reported scratch resistance is for samples measured four weeks after coating.

The following examples illustrate the invention and are not intended to limit the scope of the invention.

EXAMPLE 1

Aqueous coating solutions were mixed in a conventional manner and coated on a polyethylene terephthalate support. The coating solution was dried to form a receptive layer. The binder components of the receptive layer comprised 87.5%, by weight, water insoluble polymer. The water soluble component comprised gelatin (% Gel) and polyvinyl alcohol (% PVA) in a % weight ratio as indicated in Table A. The coating also comprised silica in the amount of 5%, by weight, relative to the weight of the water soluble polymer, gelatin, water insoluble polymer and silica taken together. The water insoluble polymer used was Glascol RP6 styrene-acrylate emulsion polymer at 47 wt % solids in water. The water soluble polymer used was DuPont Elvanol 90–50 polyvinyl alcohol, 99% hydrolyzed with a molecular weight of approximately 50,000 dissolved at 6 weight % in water. The silica used was Nissan Snowtex UP Colloidal Silica at 16.8% solids. The gelatin used was DGF Stoess photographic gelatin lot no. 67018, deionized low viscosity Type B with a bloom of >300 gm. dissolved at 6 wt % in water. Standard surfactants and coating additives were used as typical in the art.

TABLE A

| | Water Soluble | | | | |
|---|---|---|---|---|---|
| Sample | % Gel | % PVA | CW | Imp | Scr |
| A-1(AL18) | 0 | 100 | 61 | 2 | 220 |
| A-2(AL49) | 12.5 | 87.5 | 67 | 6 | 250 |
| A-3(AL52) | 25 | 75 | 70 | 5 | 285 |
| A-4(AL55) | 50 | 50 | 75 | 0.5 | 400 |

CW is coating weight in grams/dm2.
Imp is impact.
Scr is scratch resistance in grams.

The results illustrate improved scratch resistance and/or impact resistance when the water soluble component comprises gelatin.

EXAMPLE 2

A coating solution was prepared as described in Example 1 wherein the receptive layer binder comprised 87.5 weight % water insoluble polymer and 12.5 weight % water soluble component. The water soluble component comprised gelatin and polyvinyl alcohol with the weight % gelatin (% Gel) and weight % polyvinyl alcohol (% PVA) in the water soluble component indicated in Table B. The gelatin used was K&K Type 7438. The coating comprised silica in an amount of 3%, by weight, relative to the weight of the water insoluble polymer, water soluble component and silica taken together. The results are provided in Table B.

TABLE B

| | Water Soluble | | | |
|---|---|---|---|---|
| Sample | % Gel | % PVA | CW | Imp |
| B-1 | 0 | 100 | 21 | 0 |
| B-2 | 0 | 100 | 35 | 0.5 |
| B-3 | 0 | 100 | 51 | 2 |

TABLE B-continued

| | Water Soluble | | | |
|---|---|---|---|---|
| Sample | % Gel | % PVA | CW | Imp |
| B-4 | 12.5 | 87.5 | 30 | 1.5 |
| B-5 | 12.5 | 87.5 | 54 | 3 |
| B-6 | 12.5 | 87.5 | 79 | 6 |
| B-7 | 25 | 75 | 29 | 1 |
| B-8 | 25 | 75 | 50 | 4 |
| B-9 | 25 | 75 | 74 | 5 |
| B-10 | 50 | 50 | 30 | 0 |
| B-11 | 50 | 50 | 50 | 4 |
| B-12 | 50 | 50 | 75 | 0 |

CW is coating weight in grams/dm2.
Imp is impact.

The results of Example 2 indicate that acceptable impact resistance can be obtained by the inventive concept.

EXAMPLE 3

A coating solution was prepared as described in Example 1 wherein the water insoluble polymer and water soluble polymer consisted of 87.5 weight % water insoluble polymer and 12.5 weight % water soluble polymer. Mixtures of gelatin were used. The coating comprised silica in an amount of 3%, by weight, relative to the weight of the water insoluble polymer, water soluble component and silica taken together. The results are provided in Table C.

TABLE C

| | Water Soluble | | | | | | |
|---|---|---|---|---|---|---|---|
| Sample | % Gel A | % Gel B | % Gel C | % PVA | Bloom | CW | Scr |
| C-1 | 6 | 6 | | 88 | 54 | 30 | >400 |
| C-2 | 9 | 3 | | 88 | 81 | 30 | >400 |
| C-3 | 12 | | | 88 | 108 | 30 | >400 |
| C-4 | | | 12.5 | 87.5 | 302 | 28 | >400 |
| C-5 | 6 | 6 | | 88 | 54 | 51 | 165 |
| C-6 | 9 | 3 | | 88 | 81 | 51 | 165 |
| C-7 | 12 | | | 88 | 108 | 54 | 140 |
| C-8 | | | 12.5 | 87.5 | 302 | 45 | 240 |
| C-9 | 6 | 6 | | 88 | 54 | 79 | 180 |
| C-10 | 9 | 3 | | 88 | 81 | 79 | 180 |
| C-11 | 12 | | | 88 | 108 | 79 | 150 |
| C-12 | | | 12.5 | 87.5 | 302 | 67 | 250 |
| C-13 | | 25 | | 75 | 108 | 28 | >400 |
| C-14 | | | 25 | 75 | 302 | 29 | >400 |
| C-15 | | 25 | | 75 | 108 | 50 | 270 |
| C-16 | | | 25 | 75 | 302 | 46 | 320 |
| C-17 | | 25 | | 75 | 108 | 74 | 255 |
| C-18 | | | 25 | 75 | 302 | 70 | 285 |
| C-19 | | | 50 | 50 | 302 | 30 | >400 |
| C-20 | | | 50 | 50 | 302 | 51 | >400 |
| C-21 | | | 50 | 50 | 302 | 75 | >400 |

% Gel A is the percentage of K & K Type 7438 gelatin in the water soluble component.
% Gel A is the percentage of K & K Type 7438 gelatin in the water soluble component.
% Gel B is the percentage of K & K Type 7440 gelatin in the water soluble component.
% Gel C is the percentage of DGF Stoess type DLV gelatin in the water soluble component.
Bloom is in grams.
CW is coating weight in grams/dm2.
Scr is scratch.

The results of Example 3 illustrate the advantages obtained using gelatins with higher bloom strength.

The invention has been described an illustrated and it would be readily apparant to one skilled in the art that modifications could be made without departing from the spirit or scope of the invention as set forth in the accompanying claims.

What is claimed is:

1. A recording medium for phase change ink recording comprising:

a support;

a receptive layer coated on said support wherein said receptive layer comprises:

2.5–48.5%, by weight, a water soluble polymer;

0.15–25%, by weight, gelatin; and

50–95%, by weight, a water insoluble polymer and said receptive layer comprises an inorganic particulate material wherein said inorganic particulate material represents less than 50%, by weight, of a combined weight of said inorganic particulate material, said water soluble polymer and said water insoluble polymer.

2. The recording medium of claim 1 wherein said receptive layer has a coating weight of at least 1 to no more than 200 $mg/dm^2$.

3. The recording medium of claim 2 wherein said receptive layer has a coating weight of at least 10 to no more than 100 $mg/dm^2$.

4. The recording medium of claim 3 wherein said receptive layer has a coating weight of at least 15 to no more than 80 $mg/dm^2$.

5. The recording medium of claim 4 wherein said receptive layer has a coating weight of at least 15 to no more than 45 $mg/dm^2$.

6. The recording medium of claim 1 comprising 70–95%, by weight, water insoluble polymer.

7. The recording medium of claim 6 wherein said receptive layer comprises:

0.5–24.5%, by weight, a water soluble polymer;

0.5–12.5%, by weight, gelatin; and

75–95%, by weight, a water insoluble polymer.

8. The recording medium of claim 7 comprising 80–95%, by weight, water insoluble polymer.

9. The recording medium of claim 7 wherein said receptive layer has a coating weight of at least 25 to no more than 80 $mg/dm^2$.

10. The recording medium of claim 7 wherein said receptive layer comprises:

2.5–14.5%, by weight, a water soluble polymer;

0.5–7.5%, by weight, gelatin; and

85–90%, by weight, a water insoluble polymer.

11. The recording medium of claim 1 wherein said water soluble polymer is selected from the group consisting of polyvinyl alcohol, polyacrylamide, methyl cellulose, and polyvinyl pyrrolidone.

12. The recording medium of claim 1 wherein said water soluble polymer is selected from the group consisting of polyvinyl alcohol, polyacrylamide, and polyvinyl pyrrolidone.

13. The recording medium of claim 1 wherein said water soluble polymer is polyvinyl alcohol.

14. The recording medium of claim 1 wherein said water insoluble polymer comprises at least one polymerizable monomer selected from the group consisting of acrylic ester, olefin, aromatic substituted olefin, vinyl, aromatic substituted vinyl, urethane and unsaturated amide.

15. The recording medium of claim 1 wherein said water insoluble polymer comprises styrene.

16. The recording medium of claim 15 wherein said water soluble polymer is polyvinyl alcohol.

17. The recording medium of claim 15 wherein said water insoluble polymer comprising 10–100%, by weight, styrene and 0–90%, by weight, acrylic ester.

18. The recording medium of claim 17 wherein said water insoluble polymer is a copolymer comprising 50–99%, by weight, styrene and 1–50%, by weight, acrylic ester.

19. The recording medium of claim 1 wherein said inorganic particulate material is silica.

20. The recording medium of claim 1 wherein said gelatin has a bloom of at least 100 grams.

21. The recording medium of claim 1 wherein said gelatin has a bloom of at least 200 grams.

22. The recording medium of claim 1 wherein said gelatin has a bloom of at least 300 grams.

23. A recording medium for phase change ink recording comprising:

a support;

a receptive layer coated on said support wherein said receptive layer comprises:

5–50%, by weight, a water soluble component; and

50–95%, by weight, a water insoluble polymer; wherein said water soluble component comprises;

3–50% gelatin; and

50–97% water soluble polymer and said receptive layer comprises an inorganic particulate material wherein said inorganic particulate material represents less than 50%, by weight, of a combined weight of said inorganic particulate material, said water soluble component and said water insoluble polymer.

24. The recording medium of claim 23 wherein said receptive layer has a coating weight of at least 1 to no more than 200 $mg/dm^2$.

25. The recording medium of claim 24 wherein said receptive layer has a coating weight of at least 10 to no more than 100 $mg/dm^2$.

26. The recording medium of claim 25 wherein said receptive layer has a coating weight of at least 15 to no more than 80 $mg/dm^2$.

27. The recording medium of claim 26 wherein said receptive layer has a coating weight of at least 15 to no more than 45 $mg/dm^2$.

28. The recording medium of claim 1 comprising 70–95%, by weight, water insoluble polymer.

29. The recording medium of claim 28 wherein said receptive layer comprises:

0.5–24.5%, by weight, a water soluble polymer;

0.5–12.5%, by weight, gelatin; and

75–95%, by weight, a water insoluble polymer.

30. The recording medium of claim 29 comprising 80–95%, by weight, water insoluble polymer.

31. The recording medium of claim 23 wherein said water soluble polymer is selected from the group consisting of polyvinyl alcohol, polyacrylamide, methyl cellulose, and polyvinyl pyrrolidone.

32. The recording medium of claim 23 wherein said water soluble polymer is selected from the group consisting of polyvinyl alcohol, polyacrylamide, and polyvinyl pyrrolidone.

33. The recording medium of claim 23 wherein said water soluble polymer is polyvinyl alcohol.

34. The recording medium of claim 23 wherein said water insoluble polymer comprises at least one polymerizable monomer selected from the group consisting of acrylic ester, olefin, aromatic substituted olefin, vinyl, aromatic substituted vinyl, urethane and unsaturated amide.

35. The recording medium of claim 23 wherein said water insoluble polymer comprises styrene.

36. The recording medium of claim 35 wherein said water insoluble polymer comprising 10–100%, by weight, styrene and 0–90%, by weight, acrylic ester.

37. The recording medium of claim 36 wherein said water insoluble polymer is a copolymer comprising 50–99%, by weight, styrene and 1–50%, by weight, acrylic ester.

* * * * *